April 21, 1959

M. GRENIER 2,882,998

PROCESS FOR THE REGENERATION OF AN ADSORBENT BED

Filed Oct. 31, 1956

INVENTOR

MAURICE GRENIER

United States Patent Office 2,882,998
Patented Apr. 21, 1959

2,882,998
PROCESS FOR THE REGENERATION OF AN ADSORBENT BED

Maurice Grenier, Paris, France, assignor to L'Air Liquide, Societe Anonyme pour l'Etude et l'Exploitation des Procedes Georges Claude, Paris, France Application October 31, 1956, Serial No. 619,437
Claims priority, application France November 10, 1955
4 Claims. (Cl. 183—114.2)

The present invention relates to a process for the regeneration of an adsorbent bed, applicable more particularly to the low temperature separation of gas mixtures by adsorption, and especially to the carbon dioxide removal by adsorption at low temperature, from air to be separated into its components by liquefaction and rectification.

For regenerating an adsorbent bed impregnated with carbon dioxide, one generally simply heats up the whole adsorbent bed, for instance by means of a coil immersed in the bed and through which a hot fluid flows. It has been suggested also to operate under a reduced pressure and to heat said bed by the passing, in direct contact, of a so-called scavenging gas containing no carbon dioxide and consisting for instance of part of the issuing oxygen or nitrogen, said scavenging gas having a direction of circulation opposite to that of the fluid to be purified during the adsorption phase.

In all cases, the heating of the adsorbent bed is kept up until the entire bed is at a temperature equal to or higher than the room temperature.

These methods of regeneration offer the drawbacks that they involve cold losses; in addition, when the heating is effected by direct contact, a relatively important amount of one of the separation products is contaminated.

The process which is an object of the invention aims at obviating the above mentioned drawbacks in the case of desorption by heating, by means of a fluid having a direction of circulation opposite to that of the fluid to be purified during the adsorption phase; its main feature resides in that the circulation of the heating fluid is stopped after the temperature of the end of the adsorbent bed through which the heating fluid comes out has risen, but before the temperature of the adsorbent bed has become uniform.

It has been discovered, indeed, that it is not necessary, for obtaining a satisfactory desorption, to heat the entire bed up to a high temperature, but it is sufficient to heat the adsorbent bed in a heterogeneous manner so that in each region of the bed, the temperature, at the end of the heating, be substantially in inverse ratio to its degree of impregnation.

The heating fluid may be circulated in indirect contact with the adsorbent bed; the heating fluid is not contaminated and the extraction of the desorption products is ensured by the action of the vacuum.

The heating fluid may also be circulated in direct contact with the adsorbent bed; this fluid, then is contaminated, but a very small amount of warm fluid is necessary for obtaining a heterogeneous heating of the bed; as soon as this result has been achieved, the circulation of the heating fluid is discontinued and preferably the bed is subjected to the action of a vacuum.

In both cases, the heating of the adsorbent bed is much lower than that which is generally carried out: the resulting cold loss, therefore, is quite small. In addition, the heating fluid, issuing, during almost the entire heating operation, at a temperature fairly close to the initial temperature of the bed, has a cold content which is easily recoverable, either by a simple mixing if said fluid has not been contaminated, or by passing through an exchanger in the contrary case.

By way of example, there are described hereinafter and represented in the appended drawings, two forms of embodiment of the invention as applied to the carbon dioxide removal from air in an installation for the separation of air by liquefaction and rectification.

Figure 1:
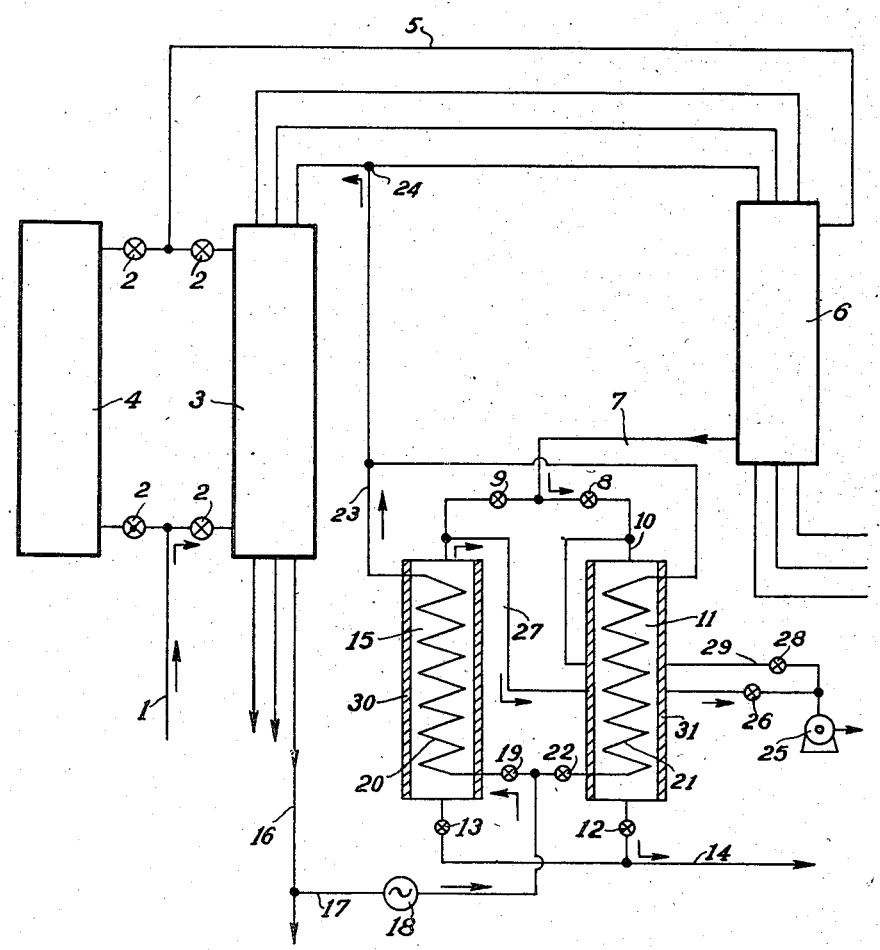
Figure 1 shows, a diagrammatically a device for carbon dioxide removal by adsorption, in which the heating of the adsorbent bed to be regenerated is effected by the passing of a gas in indirect contact with the mass.

In Figure 1 the air to be decarbonated and separated into its components arrives under pressure and at ambient temperature through a pipe 1. By means of a series of valves 2, it then passes through one of the interchangeable heat exchangers 3 and 4 in which it leaves its moisture, and from which it issues at a temperature of about —80° C. (It has been assumed, in the drawing, that the exchanger 3 was in operation and the exchanger 4 was being defrosted.) The air then goes through the pipe 5 to the heat exchanger 6 whence it issues through the pipe 7 at a temperature of approximately —130° C. The valve 8 being open and the valve 9 closed, it enters, through the pipe 10, the adsorber 11, filled, for instance, with activated alumina. The valve 12 being open and the valve 13 being closed, the air comes out of the adsorber 11 freed of its carbon dioxide and goes through the pipe 14 to the liquefier and expander of the separation installation.

While the adsorber 11 is in use, an identical adsorber 15 is being regenerated. Part of the pure nitrogen coming from the separation installation and having gone through exchanger 6 and exchanger 3 through the pipe 16 is sent through the pipe 17, the blower 18 and valve 19 into a coil 20 immersed in the bed of activated alumina contained in the adsorber 15. An identical coil 21 exists in the adsorber 11 but it is isolated by the closing of the valve 22. On coming out of the coil 20, the nitrogen is at a temperature which remains around —115° C. during the greater part of the heating; then it rises slowly. According to the invention, the nitrogen circulation is stopped as soon as its temperature when coming out reaches approximately —75° C. The temperature of the adsorbent bed at the outlet end is then about —80° C. At the other end, it is about —25° C.

The nitrogen issuing from the pipe 23 mixes at 24 with the nitrogen issuing from the exchanger 6 before it enters the exchanger 3; thus the cold content of the nitrogen issuing from the coil 20 is recovered.

When the circulation of the heating nitrogen is discontinued, a vacuum pump 25 is started, which, through the valve 26 and pipe 27 sucks in the products of the desorption of the adsorber 15 in such a manner that these products go through the adsorbent bed in a direction opposite to that of the air to be decarbonated.

After a time sufficient for the evacuation of the adsorbed products, the vacuum pump is stopped and the valve 26 is closed. The adsorber 15 is then ready to be put in operation again. This is effected by closing the valves 8 and 12 and opening the valves 9 and 13. It is possible, thenceforth, to begin the regeneration of the adsorber 11 by heating it by sending into the coil 21, through the blower 18 and valve 22 part of the nitrogen from the exchanger 3. When the desired heating has been obtained, the nitrogen circulation is stopped and the vacuum pump 25 is started, which now sucks in through the valve 28 and pipe 29 the products of the desorption of the adsorber 11.

It should be noted that if the two adsorbers 11 and 15 have metal casings, the high thermal capacity and good conductibility of such a casing oppose the warming up of the adsorbent bed and particularly create an heterogeneous temperature distribution in each cross section of that bed. It is then preferable to arrange, between the casing and adsorbent bed, a layer 30 and 31 of heat insulating material.

Figure 2:
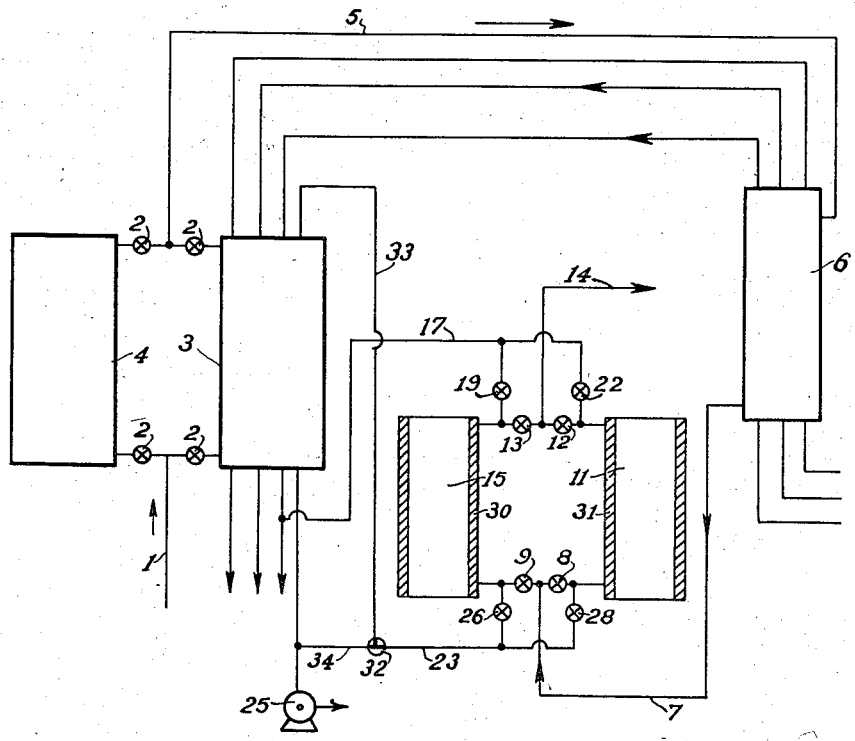
Figure 2 shows, diagrammatically, a device of the same type in which the heating gas is in direct contact with the bed.

In Figure 2, the arrangement of the assembly is identical with that of Figure 1. However, the direction of circulation of the gases through the adsorbers has been reversed. The air to be decarbonated arriving through the pipe 7 goes through valve 8 which is open and enters the bottom of the adsorber 11. It then goes through the valve 12 and pipe 14 to the liquefier.

In the adsorber 15, which is being regenerated, the pure scavenging nitrogen comes in through the pipe 17 and valve 19. The arrival of hot nitrogen takes place at the top of the adsorber and not at the bottom, which offers the advantage of preventing the building up of convection currents which might result from the tendency of the warm gas to rise, and of the cold gas to move down, and which would hinder the obtaining of the desired temperature distribution.

After coming out of the adsorber 15, the nitrogen goes, through the valve 26, the pipe 23, the three-way valve 32 and the pipe 33 to a tubular bundle of the exchanger 3 so as to recover the cold it can still yield, then it is evacuated by the vacuum pump 25 which, thus, plays the part of a circulation pump.

When the desired warming up has been obtained, the arrival of nitrogen is discontinued by closing the valve 19 and the vacuum pump 25 is allowed to evacuate the carbon dioxide through the tube 23, the valve 32 and the tube 34, putting the bundle of the exchanger 3 out of circuit.

The purifying adsorber may also be subjected to several alternate operations of heating and vacuum extraction, by periodically opening and closing the valve 19.

This makes it possible to extract the carbon dioxide more completely than by the only action of vacuum, since the proportion of carbon dioxide in the nitrogen remaining in the adsorber and consequently its partial pressure decrease more and more in the successive fractions.

It is thus possible to ensure, by one or another of the devices described, or by any device based on the same principle of heterogeneous warming up, a particularly easy and economical periodic regeneration of purifying adsorbers for gases, in particular decreasing to a minimum the cold losses and making it possible to use them continuously for very long periods.

What I claim is:

1. A process for separating carbon dioxide and nitrogen from air at low temperatures, comprising the steps of: cooling the impure air by heat exchange with separated nitrogen and drying it, cooling it again by heat exchange with said separated nitrogen to about $-130°$ C., passing it at said temperature in a given direction alternately through one of a pair of adsorbent beds, thereby stripping it of its carbon dioxide, passing it through a separation installation wherein the above-mentioned separated nitrogen is recovered, passing at least part of a warmed separated nitrogen coming from the said first air-cooling step in heat exchange relationship with the other one of said adsorbent beds laden with carbon dioxide, thereby warming said bed and desorbing the carbon dioxide, warming again said part of said separated nitrogen by heat exchange with the incoming air, and cyclically discontinuing the flow of the said part of the warmer separated nitrogen through said other adsorbent bed when the temperature of the adsorbent bed through which it comes out is about $-80°$ C., evacuating the carbon dioxide, and exchanging the streams of air and of the part of the separated nitrogen through the adsorbent beds.

2. A process for separating carbon dioxide and nitrogen from air at low temperatures, comprising the steps of: cooling the impure air by heat exchange with separated nitrogen and drying it, cooling it again by heat exchange with said separated nitrogen to a temperature under $-110°$ C., passing it at said temperature in a given direction alternately through one of a pair of adsorbent beds, thereby stripping it of its carbon dioxide, passing it through a separation installation wherein the above-mentioned separated nitrogen is recovered, passing at least part of a warmed separated nitrogen coming from the said first air-cooling step in heat exchange relationship with the other one of said adsorbent beds, laden with carbon dioxide, in the opposite direction, thereby warming said bed and desorbing the carbon dioxide, warming again said part of said separated nitrogen by heat exchange with the incoming air, and cyclically discontinuing the flow of the said part of the warmer separated nitrogen through said other adsorbent bed after its temperature at the outlet of said other adsorbent bed has risen, but before it has risen by more than $50°$ C. above its outlet temperature at the beginning of the warming operation, evacuating the carbon dioxide, and exchanging the streams of air and of the part of the separated nitrogen through the adsorbent beds.

3. A process for separating carbon dioxide and nitrogen from air at low temperatures, comprising the steps of: cooling the impure air by heat exchange with separated nitrogen and drying it, cooling it again by heat exchange with said separated nitrogen to about $-130°$ C., passing it at said low temperature in a given direction alternately through one of a pair of adsorbent beds, thereby stripping it of its carbon dioxide, passing it through a separation installation wherein the above-mentioned separated nitrogen is recovered, passing at least part of a warmed separated nitrogen coming from the said first air-cooling step in heat exchange relationship with the other one of said adsorbent beds, laden with carbon dioxide, in the opposite direction, thereby warming said bed and desorbing the carbon dioxide, warming again said part of said separated nitrogen by heat exchange with the incoming air, and cyclically discontinuing the flow of the said part of the warmer separated nitrogen through said other adsorbent bed after its temperature at the outlet of the adsorbent bed has risen, but before it has become equal to its temperature at the inlet of said adsorbent bed, evacuating the carbon dioxide, and exchanging the streams of air and of the part of the separated nitrogen through the adsorbent beds.

4. A process for separating carbon dioxide and nitrogen from air at low temperatures, comprising the steps of: cooling the impure air by heat exchange with separated nitrogen and drying it, cooling it again by heat exchange with said separated nitrogen to a temperature under $-110°$ C., passing it at said low temperature in a given direction alternately through one of a pair of adsorbent beds, thereby stripping it of its carbon dioxide, passing it through a separation installation wherein the above-mentioned separated nitrogen is recovered, passing at least part of a warmed separated nitrogen coming from the said first air-cooling step in indirect heat exchange relationship with the other one of said adsorbent beds, laden with carbon dioxide, in the opposite direction, thereby warming said bed and desorbing the carbon dioxide, warming again said part of said separated nitrogen by heat exchange with the incoming air, and cyclically discontinuing the flow of said part of the warmer separated nitrogen into indirect heat exchange with said other adsorbent bed after its temperature at the outlet of the adsorbent bed has risen, but before it has become equal to its temperature at the inlet of the adsorbent bed, evacuating the carbon dioxide, and exchanging the streams of air and of the part of the separated nitrogen through the adsorbent beds.

References Cited in the file of this patent

UNITED STATES PATENTS

| | | |
|---|---|---|
| 1,934,075 | Lewis | Nov. 7, 1933 |
| 2,545,194 | Colburn et al. | Mar. 13, 1951 |
| 2,625,237 | Gribler et al. | Jan. 13, 1953 |
| 2,643,525 | Cartier | June 30, 1953 |
| 2,661,808 | Kahle | Dec. 8, 1953 |
| 2,665,769 | Walker et al. | Jan. 12, 1954 |